US010240327B2

(12) United States Patent
Chernov et al.

(10) Patent No.: US 10,240,327 B2
(45) Date of Patent: Mar. 26, 2019

(54) PASSIVE-FLUID DOSING ASSEMBLY

(71) Applicant: Haier US Appliance Solutions, Inc., Wilmington, DE (US)

(72) Inventors: Gregory Sergeevich Chernov, Louisville, KY (US); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 328 days.

(21) Appl. No.: 15/212,316

(22) Filed: Jul. 18, 2016

(65) Prior Publication Data

US 2018/0016774 A1    Jan. 18, 2018

(51) Int. Cl.
| | | |
|---|---|---|
| *B05B 1/18* | (2006.01) | |
| *B05B 7/24* | (2006.01) | |
| *C02F 1/68* | (2006.01) | |
| *C02F 1/70* | (2006.01) | |
| *E03C 1/046* | (2006.01) | |
| *B01F 3/08* | (2006.01) | |
| *C02F 1/00* | (2006.01) | |

(52) U.S. Cl.
CPC ............ *E03C 1/046* (2013.01); *B01F 3/0865* (2013.01); *B05B 7/2445* (2013.01); *C02F 1/686* (2013.01); *B05B 1/18* (2013.01); *C02F 1/001* (2013.01); *C02F 1/70* (2013.01); *C02F 2303/185* (2013.01)

(58) Field of Classification Search
CPC .. B05B 1/18; C02F 1/001; C02F 1/685; C02F 1/687; C02F 1/688; C02F 1/70; C02F 2303/185; E03C 1/046; B01F 1/0027; B01F 1/0033; B01F 2001/0055; B01F 2001/0061; B01F 3/08; B01F 3/0861; B01F 3/0865
See application file for complete search history.

(56) References Cited

U.S. PATENT DOCUMENTS

| | | | | |
|---|---|---|---|---|
| 3,419,360 | A | * | 12/1968 | Rak ........................ C02F 1/688 239/310 |
| 5,730,178 | A | * | 3/1998 | Zhadanov ............... C02F 1/688 137/268 |
| 6,702,944 | B2 | | 3/2004 | Husain et al. |
| 8,216,466 | B2 | | 7/2012 | Bassett et al. |
| 9,095,825 | B2 | | 8/2015 | Gilmore et al. |

(Continued)

FOREIGN PATENT DOCUMENTS

GB      1133842 A    11/1968

*Primary Examiner* — Lucas A Stelling
(74) *Attorney, Agent, or Firm* — Dority & Manning, P.A.

(57) ABSTRACT

A passive fluid dosing assembly and system is provided. The passive fluid dosing system may include a passive dosing body, a pressure plate, and a treatment enclosure. The passive dosing body may define a primary flow path and a liquid treatment path. The primary flow path may be defined between a fluid inlet and a fluid outlet. The liquid treatment path may be defined between a high pressure port and a low pressure port, bypassing a portion of the primary flow path. The pressure plate may be disposed within the passive dosing body between the high pressure port and the low pressure port. The pressure plate may define an internal orifice. The treatment enclosure may be positioned in fluid communication between the high pressure port and the low pressure port along the liquid treatment path. The treatment enclosure may define a solute chamber housing a dosed media.

19 Claims, 5 Drawing Sheets

(56) References Cited

U.S. PATENT DOCUMENTS

| | | | |
|---|---|---|---|
| 2005/0167351 A1* | 8/2005 | Herman | B01D 37/025 210/209 |
| 2008/0011656 A1* | 1/2008 | Lacy | C02F 1/003 210/95 |
| 2012/0055886 A1* | 3/2012 | Hunter | C02F 1/003 210/767 |

* cited by examiner

PASSIVE-FLUID DOSING ASSEMBLY

FIELD OF THE INVENTION

The present subject matter relates generally to liquid treatment and filtration systems, and more particularly to systems for passively treating flowing liquids.

BACKGROUND OF THE INVENTION

During the delivery of liquids, such as water, it may be desirable to treat the liquid before it reaches a user or consumer. For instance, a user may wish to treat water at a point of entry or a point of use to incorporate or remove certain additives. Some additives, such as chlorine or chloramine, may already be incorporated into a domestic water supply. These additives may serve to disinfect or sanitize the water supply. However, these additives may also present certain drawbacks to a user. For instance, the presence of chlorine and/or chloramine is known to affect the taste of water. As a result, a user may wish to remove or neutralize these additives before using the water, e.g., for drinking, washing, or cooking.

Some existing systems provide porous filtration devices to passively treat or remove additives from water. Although porous filtration devices may be able to filter out certain larger additives, their efficacy is often limited by the pore size of the associated filtration media and/or the contact time of water with the filtration media. In general, particle exclusion filtration does not remove dissolved contaminants. Increasing the efficacy of such devices often results in undesirably increasing upstream water pressure and/or decreasing downstream water pressure. Moreover, increasing efficacy of the filtration system may greatly increase the time needed to treat the water, i.e., the time needed before the water is ready for use. These pressure variations and increases in treatment time may render the systems otherwise unusable for many applications.

In some instances, it may be possible to provide an active treatment system to actively inject one or more neutralizing or removal agents into a water flow. For instance, an automated pump may be provided to selectively inject a dosing agent into a water flow. However, such systems would necessarily require an active (e.g., mechanical and/or electronic) pump and/or controller apparatus. Multiple mechanical and/or electronic parts may increase the system's overall complexity, as well as the risk that the system may break.

Accordingly, a passive system for fluid treatment would be desirable. In particular, it would be desirable to have a passive system for dosing a liquid, such as water, flowing through the system without the use of additional active components.

BRIEF DESCRIPTION OF THE INVENTION

Aspects and advantages of the invention will be set forth in part in the following description, or may be obvious from the description, or may be learned through practice of the invention.

In one aspect of the present disclosure, a passive fluid dosing system is provided. The passive fluid dosing system may include a passive dosing body, a pressure plate, and a treatment enclosure. The passive dosing body may define a primary flow path and a discrete liquid treatment path. The primary flow path may be defined between a fluid inlet and a fluid outlet. The liquid treatment path may be defined between a high pressure port and a low pressure port, bypassing a portion of the primary flow path. The high pressure port may be positioned downstream from the fluid inlet. The low pressure port may be positioned downstream from the high pressure port and upstream from the fluid outlet. The pressure plate may be disposed within the passive dosing body between the high pressure port and the low pressure port. The pressure plate may define an internal orifice to decrease liquid pressure downstream from the pressure plate. The treatment enclosure may be positioned in fluid communication between the high pressure port and the low pressure port along the liquid treatment path. The treatment enclosure may define a solute chamber housing a dosed media to generate a treating solution delivered to the primary flow path through the low pressure port.

In another aspect of the present disclosure, a passive fluid dosing system is provided. The passive fluid dosing system may include a dosing head, a dosing cap, and a treatment enclosure. The dosing head may include a sidewall defining a fluid inlet for the receipt of a flowing liquid, and a pressure plate defining an internal orifice downstream from the fluid inlet. The dosing head may further define a high pressure port through the sidewall upstream from the internal orifice to intercept a portion of flowing liquid from the fluid inlet. A dosing cap may be disposed over the sidewall of the dosing head. The dosing cap may define a mixing chamber in downstream fluid communication with the internal orifice. The dosing cap may further define a low pressure port in fluid communication between the high pressure port and the mixing chamber. A treatment enclosure may define a solute chamber housing a dosed media therein. The treatment enclosure may be positioned in downstream fluid communication with the high pressure port to receive the liquid intercepted through the high pressure port. The treatment enclosure may be further positioned in upstream fluid communication with the low pressure port to deliver the treating solution.

In yet another aspect of the present disclosure, a passive fluid dosing system is provided. The passive fluid dosing system may include a dispensing head, a water supply conduit, a passive dosing body, a pressure plate, and a treatment enclosure. The dispensing head may define a water nozzle. The water supply conduit may be disposed in fluid communication with the dispensing head at a location upstream from the water nozzle. The passive dosing body may be disposed between the water supply conduit and the dispensing head. The passive dosing body may define a primary flow path extending from the water supply conduit to the dispensing head, a liquid treatment path bypassing a portion of the primary flow path, a high pressure port positioned along the liquid treatment path downstream from the water supply conduit, a low pressure port positioned along the liquid treatment path downstream from the high pressure port and upstream from the dispensing head, and a mixing chamber in fluid communication with the supply conduit downstream from the low pressure port. The pressure plate may be disposed within the passive dosing body between the high pressure port and the low pressure port. The pressure plate may define an internal orifice to decrease liquid pressure downstream from the pressure plate. The treatment enclosure may be positioned in fluid communication between the high pressure port and the low pressure port along the liquid treatment path. The treatment enclosure may define a solute chamber housing a dosed media to generate a treating solution delivered to the primary flow path through the low pressure port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
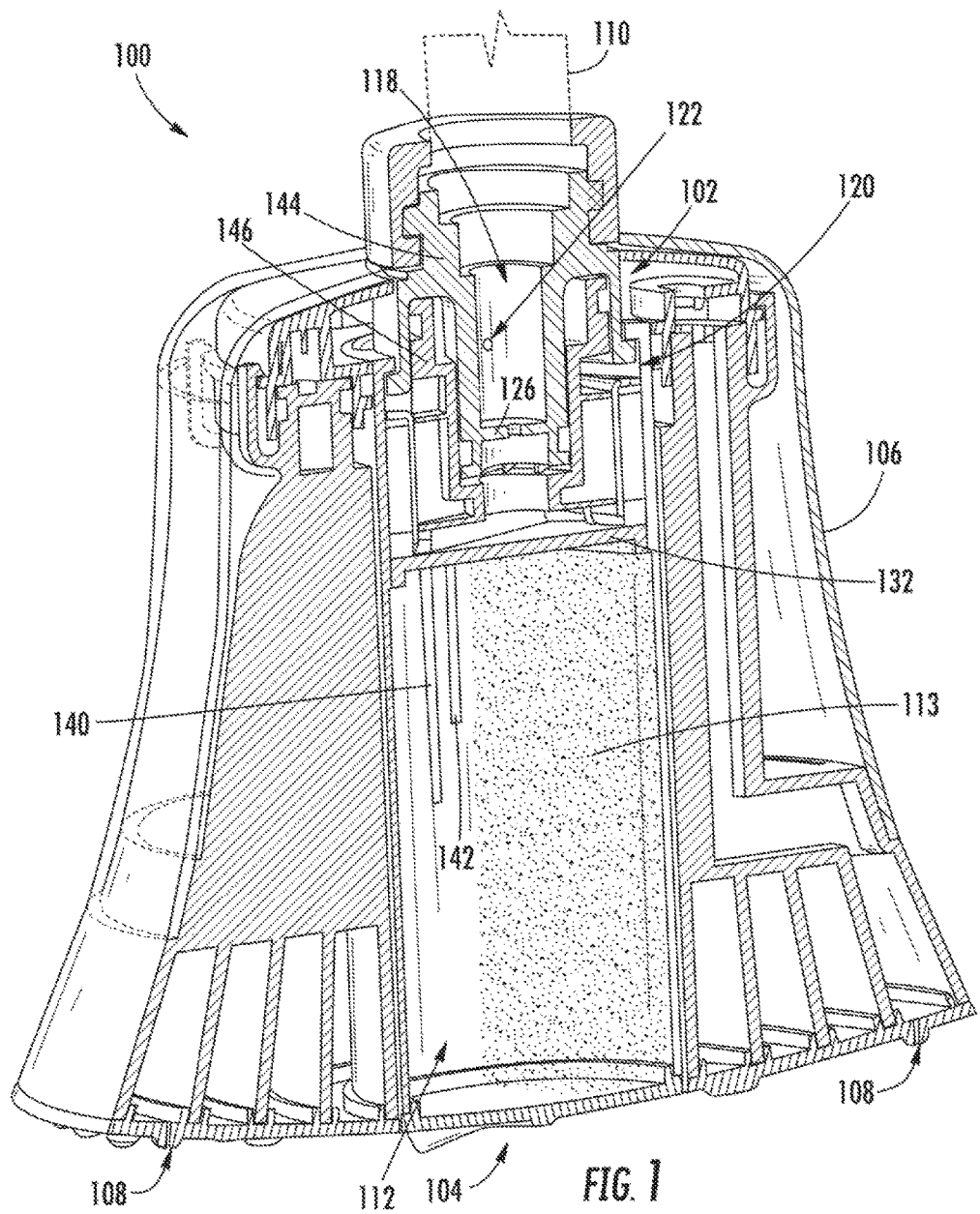
FIG. 1 provides a cross-sectional perspective view of a passive fluid dosing assembly according to an exemplary embodiment of the present disclosure.
Figure 2:
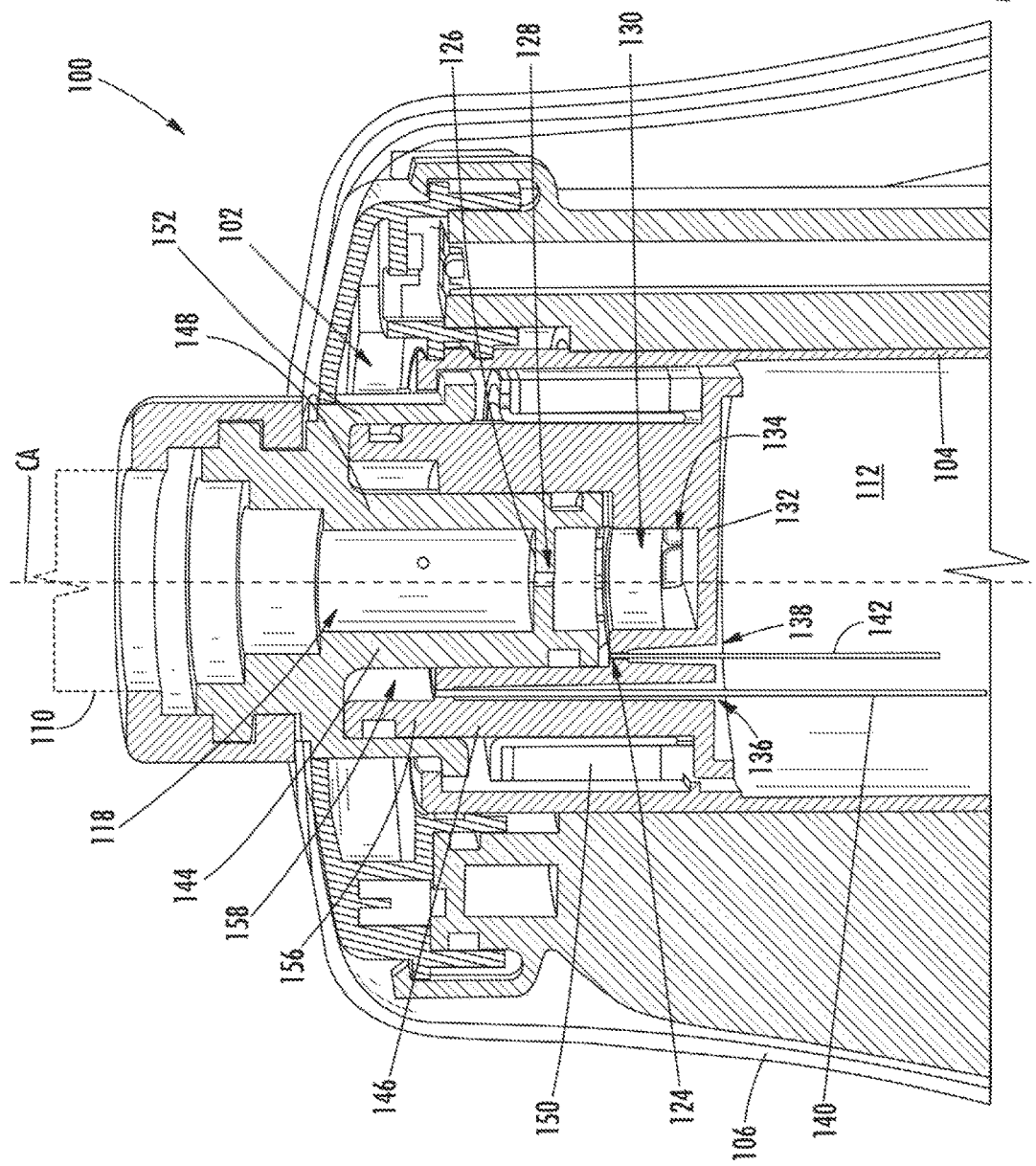
FIG. 2 provides a magnified cross-sectional view of the exemplary passive fluid dosing assembly of FIG. 1.
Figure 3:
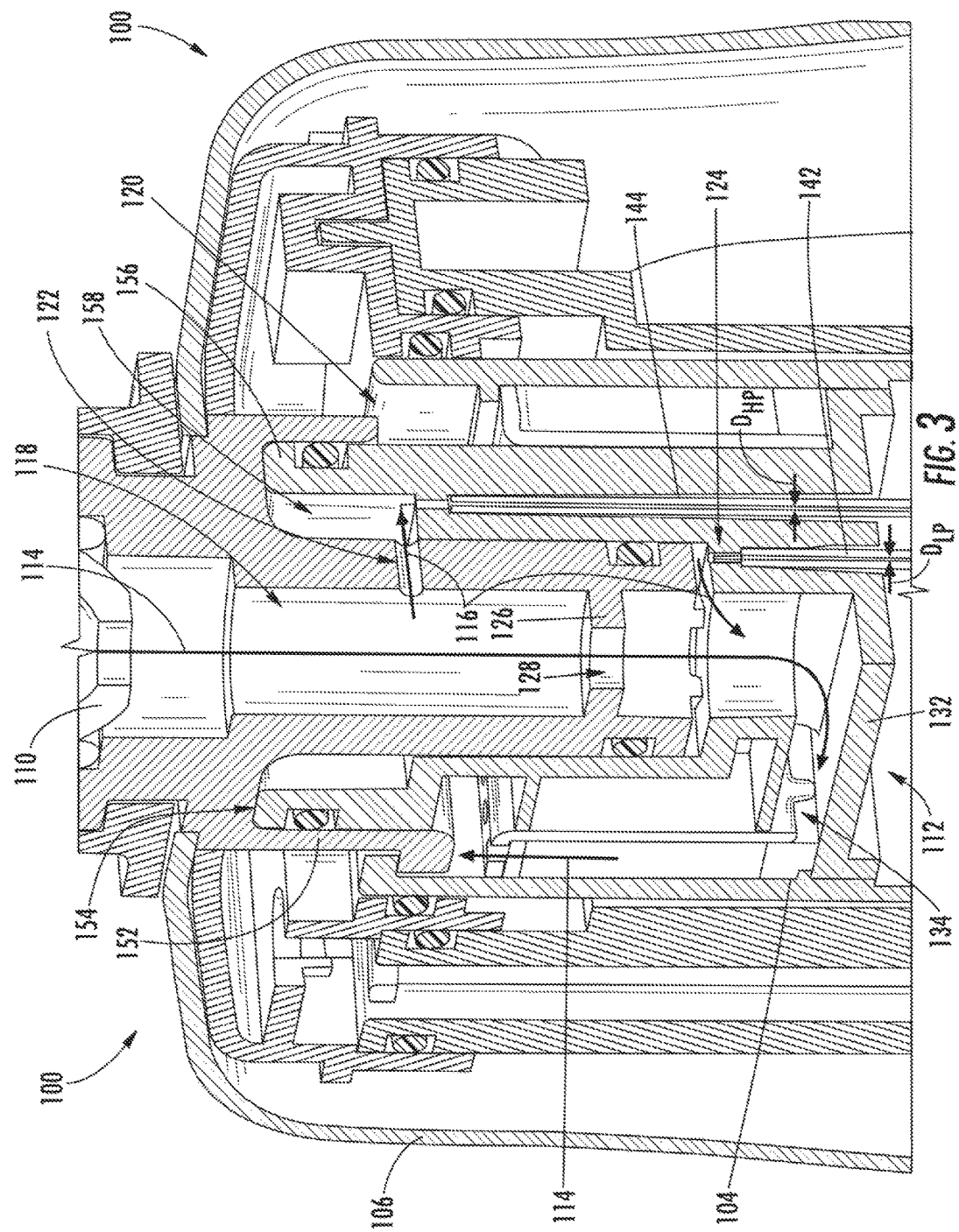
FIG. 3 provides another magnified cross-sectional view of the exemplary passive fluid dosing assembly of FIG. 1.
Figure 4:
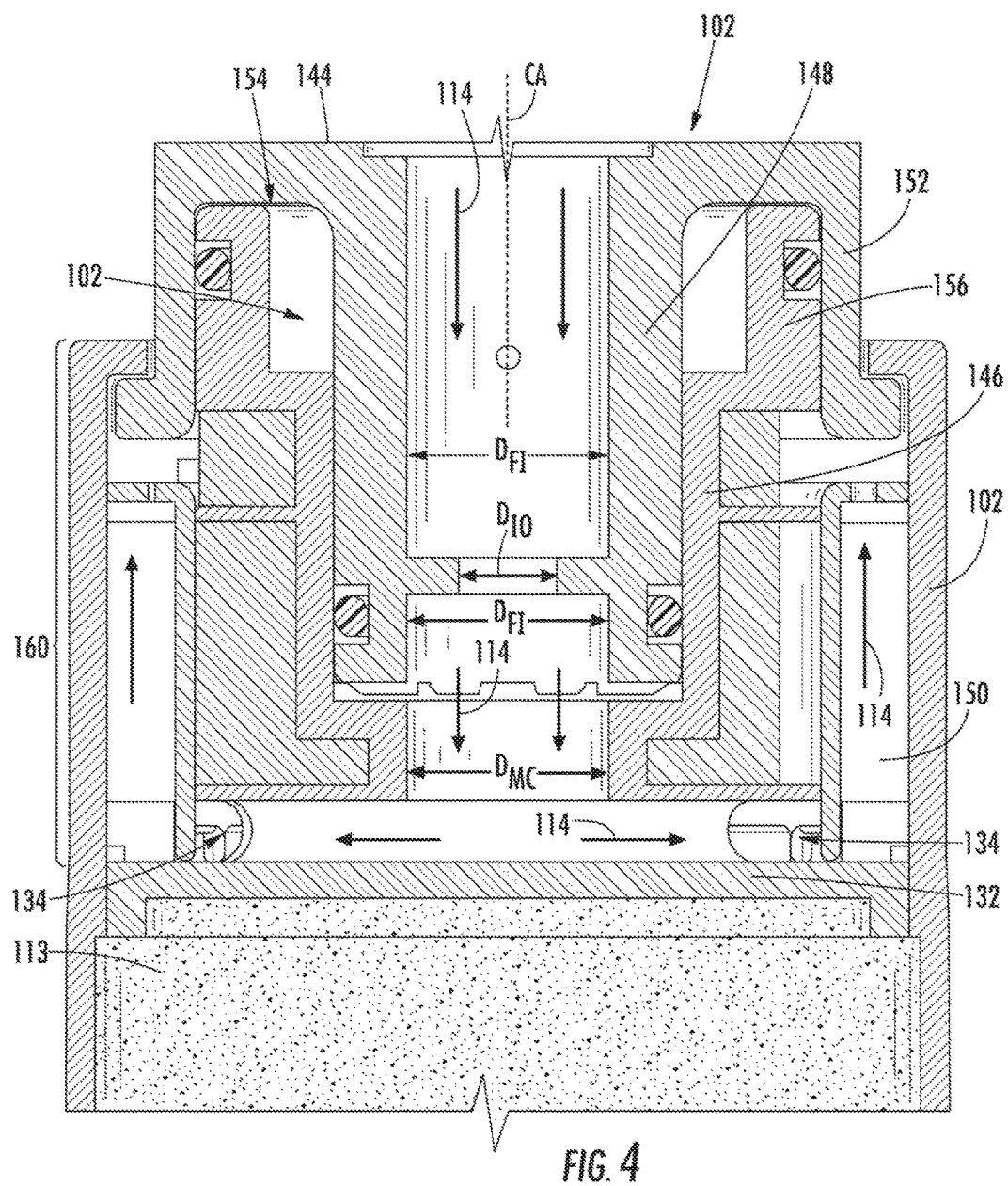
FIG. 4 provides a magnified cross-sectional side view of a portion of the exemplary passive fluid dosing assembly of FIG. 1, wherein a dispensing head has been removed.
Figure 5:
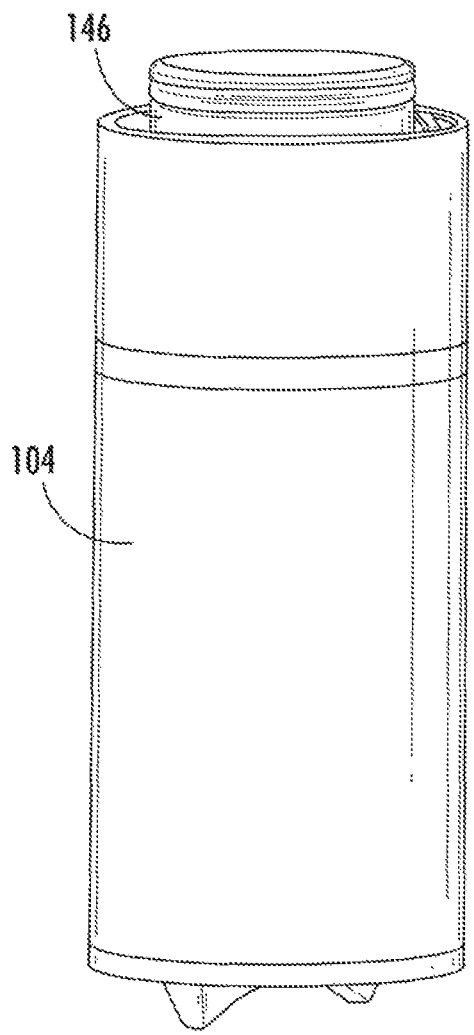
FIG. 5 provides a perspective view of the dosing cap and treatment enclosure of the exemplary passive fluid dosing assembly of FIG. 1.
Figure 6:
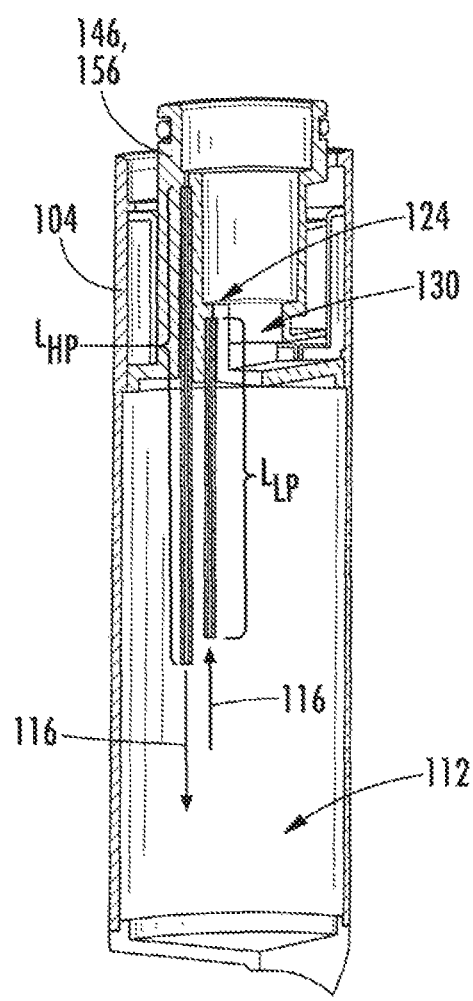
FIG. 6 provides a cross-sectional view of the exemplary dosing cap and treatment enclosure of FIG. 5.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter provides a fluid dosing system that passively generates a dosed liquid. During use, a supplied liquid, such as water, is provided to the system. Once received, the supplied liquid is mixed with a treating solution to generate the dosed liquid.

Turning to the figures, FIG. 1 provides a cross-sectional perspective view of an exemplary passive dosing system 100. As shown, the passive dosing system 100 includes a passive dosing body 102 and treatment enclosure 104 for treating an initial or supplied liquid (e.g., water) that is provided to the system 100. Using the initial liquid, passive dosing system 100 may generate a dosed treating solution to treat the initial liquid.

In exemplary embodiments, passive dosing body 102 and treatment enclosure 104 are positioned in fluid communication between a water supply (not pictured) and a water output, such as a dispensing head 106 (e.g., faucet, spout, shower head, etc.) defining one or more water nozzles 108. Water supply may include a pressurized domestic water source, such as a well or municipal water supply, that delivers pressurized water to a water supply conduit 110 when assembled. Passive dosing body 102 may be disposed between the water supply conduit 110 and the dispensing head 106. During use, a supplied liquid may be directed through passive dosing body 102 and to dispensing head 106. From the water supply conduit 110, the supplied liquid may be directed through passive dosing body 102. As will be described in detail below, at least a portion of supplied liquid passing through passive dosing body 102 may be directed through a solute chamber 112 defined by treatment enclosure 104 before being returned as a treating solution to passive dosing body 102.

Generally, it is understood that the flow of liquid, such as treating solution, is controlled through passive means. The result may be proportional dosing of the treating solution as a function of the flow rate of a supplied liquid. The output of the system 100 is a treated liquid mixture. As a result, no active moving components are required to force liquid into or out of treatment enclosure 104. Since a pressurized initial liquid is supplied, no active moving components are required to mix the initial liquid with the treating solution to generate a treated liquid (e.g., dosed liquid mixture). One or more pressure drops (i.e., differences in pressure) within passive dosing system 100 will serve to propel or motivate a portion of the initial liquid into, and through, solute chamber 112.

As illustrated in FIGS. 1 through 6, passive dosing body 102 defines multiple flow paths 114, 116 for a supplied or initial liquid (e.g., water) supplied to the system 100. In some embodiments, these include a primary flow path (indicated by arrows 114) between a fluid inlet 118 and a fluid outlet 120. Fluid inlet 118 may be defined as a substantially cylindrical void having a set diameter $D_{FI}$ along a central axis CA.

In exemplary embodiments, such as those illustrated in the figures, primary flow path 114 directs a liquid to the nozzle 108. When assembled, the primary flow path 114 extends from water supply conduit 110 to dispensing head 106. A discrete liquid treatment path (indicated by arrows 116) at least partially defined by passive dosing body 102 is in fluid communication with primary flow path 114 between inlet 118 and outlet 120. Liquid treatment path 116 may divert a portion of the flowing initial liquid away from primary flow path 114 before returning it to the primary flow path 114, e.g., as a treating solution, to mix with another portion of the initial liquid. In some such embodiments, the liquid treatment path 116 bypasses a portion of the primary flow path 114.

As shown, a high pressure port 122 and a low pressure port 124 may be defined through passive dosing body 102. Both high pressure port 122 and low pressure port 124 may be positioned along the liquid treatment path 116 to communicate with the primary flow path 114. High pressure port 122 may serve as an inlet to liquid treatment path 116 while low pressure port 124 may serve as an outlet to liquid treatment path 116. High pressure port 122 is positioned downstream from the water supply conduit 110 and permits a portion of initial liquid from the primary flow path 114 to flow into the liquid bypass path 116. Low pressure port 124 is positioned along the liquid treatment path 116 downstream from high pressure port 122 and upstream from dispensing head 106. During use, liquid within the liquid treatment path 116 is returned to the primary flow path 114 from low pressure port 124.

A pressure plate 126 is disposed within the passive dosing body 102 to generate a pressure drop along the primary flow path 114. Relative primary flow path 114, pressure plate 126 is downstream from high pressure port 122 and upstream from low pressure port 124. In some embodiments, pressure plate 126 defines one or more internal orifices 128 that limit the flow of water within the primary flow path 114. An internal orifice 128 of pressure plate 126 may include a diameter $D_{IO}$ that is smaller than the set diameter $D_{FI}$ of fluid inlet 118. For instance, diameter $D_{IO}$ of internal orifice 128 may be formed according to a predetermined ratio β relative to the set diameter $D_{FI}$, e.g., $β=(D_{IO}/D_{FI})$. In some such embodiments, predetermined ratio β is a predetermined value between about 0.2 and about 0.7. In certain embodiments, predetermined ratio β is about 0.6. Optionally, the set diameter $D_{FI}$ of fluid inlet 118 may continue downstream from pressure plate 126. In other words, sidewall 148 may define a constant set diameter $D_{FI}$ that is continuous along central axis CA both above and below pressure plate 126.

During use, pressure plate 126 may create a pressure differential across the internal orifice 128, decreasing pressure immediately downstream from the internal orifice 128 relative to pressure immediately upstream from the internal orifice 128. In other words, two unique pressures may be generated. For example, one pressure (P1) at high pressure port 122 may be generated while a distinct and different pressure (P2) is generated at low pressure port 124. The difference between P1 and P2 defines a pressure drop (ΔP) along the primary flow path 114. As shown, pressure plate 126 may be disposed between high pressure port 122 and low pressure port 124 relative to the primary flow path 114. The pressure drop ΔP across the pressure plate 126 may thus force a portion of initial liquid into high pressure port 122, through the liquid treatment path 116, and out of low pressure port 124.

Along the primary flow path 114, passive dosing body 102 defines a mixing chamber 130. Mixing chamber 130 may be defined within passive dosing body 102 downstream from the low pressure port 124, as well as upstream from dispensing head 106. In some embodiments, mixing chamber 130 defines a cylindrical void maintaining a constant diameter $D_{MC}$ along the primary flow path 114 downstream from pressure plate 126 and low pressure port 124. Mixing chamber 130 may be in fluid communication with the supply conduit 110 to receive liquid flowed through the internal orifice 128 of pressure plate 126, as well as liquid exiting low pressure port 124. Within mixing chamber 130, liquid from each flow path 114 and 116 may intermingle before continuing downstream along the primary flow path 114.

In some embodiments, the pressure drop ΔP across the pressure plate 126 may be determined or controlled according to the predetermined ratio β, diameter $D_{IO}$ and the flowrate of liquid (Q1) through the system, e.g., along the entire primary flow path 114.

$$ΔP=16*Q1^2*ρ*(1-β^4)/(π^2*C_O^2*D_{IO}^4)$$

Generally, ρ is understood to represent the known density defined as mass per volume of the initial liquid, and $C_O$ is understood to represent a known dimensionless orifice discharge coefficient.

Additionally or alternatively, the flowrate of liquid (Q1) through the system 100 may be controlled according to the predetermined ratio β and the pressure drop ΔP across pressure plate 126. The flowrate Q1 may be expressed as $$Q1=(¼)*C_O*π*D_{IO}^2*\sqrt{(ΔP/(ρ*(β^4-1))}$$

In some embodiments, a base plate 132 is disposed downstream from mixing chamber 130 along primary flow path 114. Optionally, base plate 132 may include a substantially planar surface that deflects liquid flow radially outward along liquid flow path. Base plate 132 may extend within dosing body and separate primary flow path 114 from the solute chamber 112. Optionally, base plate 132 may be disposed perpendicular to mixing chamber 130. Downstream from mixing chamber 130 and radially outward therefrom, passive dosing body 102 may define one or more radial outlets 134. In some such embodiments, primary flow path 114 extends through radial outlet 134 before continuing toward the fluid outlet 120 and dispensing head 106.

As illustrated, exemplary embodiments of base plate 132 define multiple channels 136, 138 along the liquid treatment path 116. For instance, base plate 132 may define a high pressure channel 136 and a separate low pressure channel 138. In some such embodiments, high pressure channel 136 is positioned along the liquid treatment path 116 in fluid communication with high pressure port 122. High pressure channel 136 is provided downstream from high pressure port 122 (e.g., in downstream fluid communication) such that liquid flowing through high pressure port 122 may be delivered to the solute chamber 112 through high pressure channel 136. Low pressure channel 138 is positioned along the liquid treatment path 116 in fluid communication with low pressure port 124. Low pressure channel 138 is provided upstream from low pressure port 124 (e.g., in upstream fluid communication) such that liquid flowing to low pressure port 124 may be delivered from the solute chamber 112 through low pressure channel 138.

As noted above, a treatment enclosure 104 is provided to define a solute chamber 112. A portion of treatment enclosure 104, including solute chamber 112, is generally positioned along the liquid treatment path 116. In some such embodiments, treatment enclosure 104 is positioned in fluid communication between high pressure port 122 and low pressure port 124 along the liquid treatment path 116. Within the solute chamber 112, treatment enclosure 104 may house a dosed media 113. Dosed media 113 may be generally configured to generate a treating solution when the initial liquid is introduced, e.g., through high pressure channel 136. In some embodiments, an initial liquid that includes water is supplied to solute chamber 112. The introduction of water to the dosed media 113 may force a portion of the dosed media 113 to dissolve into water, thereby generating the treating solution. After the treating solution has been generated, at least a portion of the treating solution may be delivered to the primary flow path 114, e.g., through low pressure channel 138. Specific dosed media 113 may be provided according to the desired treating solution or dosed liquid to be delivered by the system 100. In some embodiments, a redox agent, such as a chlorine and or chloramine-neutralizing agent (e.g., potassium metabisulfite, sodium metabisulfite, sodium bisulfite, sodium ascorbate, ascorbic acid, or another suitable agent), may be included as part of the dosed media 113.

In certain embodiments, one or more capillary tubes 140, 142 are disposed through the discrete channels 136, 138. For instance, a high pressure capillary tube 140 may extend into passive dosing body 102 through high pressure channel 136 while a low pressure capillary tube 142 extends into passive dosing body 102 through low pressure channel 138. In some embodiments, high pressure capillary tube 140 is provided in fluid communication between high pressure port 122 and solute chamber 112. Low pressure capillary tube 142 is provided in fluid communication between solute chamber 112 and low pressure port 124. Each capillary tube 140 and 142 may extend at least partially through solute chamber 112. As illustrated, during use, liquid generally flows along the liquid treatment path 116 from high pressure port 122, through high pressure capillary tube 140, and into solute chamber 112. From solute chamber 112, liquid flows along the liquid treatment path 116, through low pressure capillary tube 142, and to low pressure port 124.

The size of the capillary tubes 140 and 142 (e.g., internal tube diameters $D_{HP}$ and $D_{LP}$ and tube lengths $L_{HP}$ and $L_{LP}$) may be tuned according to the desired dosing of liquid from the solute chamber 112, e.g., as a function of the pressure drop ΔP and/or flow rate of dosed liquid from the system 100. The dosing flow rate (Q2), e.g., flow rate from liquid treatment path 116, may then be contingent upon the flowrate Q1 through the system 100. The dosing flow rate Q2 may be passively controlled according to the formula $$Q2 = (\pi * D_{HP}^4 * D_{LP}^4 * \Delta P)/(128*(L_{LP}*\mu_S*D_{HP}^4 L_{HP}*\mu_W*D_{LP}^4))$$

Generally, $\mu_W$ is understood to represent the known dynamic viscosity of the initial liquid, while $\mu_S$ is understood to represent the known dynamic viscosity of the treating solution.

In some such embodiments, the internal diameter $D_{HP}$ of high pressure capillary tube 140 is between about 0.001 inches and about 0.1 inches. In specific embodiments, the internal diameter $D_{HP}$ of high pressure capillary tube 140 is between about 0.005 inches and about 0.010 inches. The internal diameter $D_{LP}$ of the low pressure capillary tube 142 is between about 0.001 inches and about 0.1 inches. In certain embodiments, the internal diameter $D_{LP}$ of low pressure capillary tube 142 is between about 0.005 inches and about 0.010 inches. Each of high pressure capillary tube 140 and low pressure capillary tube 142 may have identical internal diameters ($D_{Hp}$ and $D_{LP}$, respectively).

In additional or alternative embodiments, the tube length $L_{HP}$ of the high pressure capillary tube 140 is between about 0.25 inches and about 6 inches. Moreover, the tube length $L_{LP}$ of the low pressure capillary tube 142 is between about 0.25 inches and about 6 inches. Each of high pressure capillary tube 140 and low pressure capillary tube 142 may have distinct tube lengths ($L_{HP}$ and $L_{LP}$, respectively). For instance, the tube length $L_{HP}$ of high pressure capillary tube 140 may be greater than the length $L_{LP}$ of low pressure capillary tube 142.

In optional embodiments, a filter body 150 is provided along the primary flow path 114. For instance, filter body 150 may be disposed downstream of mixing chamber 130 and/or radial outlet 134. Filter body 150 may be provided as an annular member, e.g., a ring, disposed about passive dosing body 102. In some such embodiments, filter body 150 is disposed about radial outlet 134 to direct the dosed liquid therethrough. Filter body 150 may include one or more secondary filtration media. In some such embodiments, secondary filtration media includes one or more suitable media (e.g., activated carbon, rigid fine mesh, pleated paper, melt blown polypropylene, open cell foam, and/or kinetic degradation fluxion media) to filter certain contaminants and further mix the treated liquid flowing therethrough.

In some embodiments, one or more features of the passive fluid dosing system 100 may be provided as discrete and selectively separable elements. For instance, in exemplary embodiments, passive dosing body 102 includes a separate dosing head 144 and dosing cap 146. Each of the dosing head 144 and dosing cap 146 may be joined together, e.g., via a mated connector segment or friction fit.

As shown in FIGS. 1 through 4, dosing head 144 includes a sidewall 148 defining fluid inlet 118. As noted above, fluid inlet 118 receives a pressurized initial liquid, e.g., water, from water supply conduit 110. In some embodiments, pressure plate 126 is included within dosing head 144 and extends across sidewall 148, e.g., perpendicular to central axis CA. Internal orifice 128 of pressure plate 126 may be coaxial with fluid inlet 118. Optionally, pressure plate 126 may be integrally joined to dosing head 144, e.g., such that sidewall 148 and pressure plate 126 form a substantially monolithic structure of a continuous material.

In optional embodiments, high pressure port 122 is defined through the sidewall 148, e.g., perpendicular to central axis CA. As noted above, high pressure port 122 is defined upstream from pressure plate 126. At least a portion of water flowing into fluid inlet 118 may be intercepted by high pressure port 122 and directed along the water treatment path outside of the dosing head 144.

In some embodiments, dosing head 144 includes a retainer collar 152 that is disposed about central axis CA and radially outward from fluid inlet 118. Retainer collar 152 may be coaxial with sidewall 148. Between retainer collar 152 and sidewall 148, dosing head 144 may define a hollow annular groove 154. As shown, annular groove 154 may be partially enclosed by retainer collar 152 and sidewall 148. In some such embodiments, annular groove 154 includes an open face that is open in a direction parallel to central axis CA, e.g., facing away from the water supply conduit 110.

Attached to dosing head 144 may be a discrete dosing cap 146. In some embodiments, dosing cap 146 is configured to be selectively fixed to and removed from dosing head 144. When assembled, e.g., when dosing head 144 is fixed to dosing cap 146, dosing cap 146 is disposed over sidewall 148 of the dosing head 144. Dosing cap 146 may extend along central axis CA coaxial to dosing head 144. At least a portion of dosing cap 146 may continue past sidewall 148, e.g., along central axis CA, to define a portion of the primary flow path 114. In some such embodiments, dosing cap 146 defines mixing chamber 130 in downstream fluid communication with the internal orifice 128. Mixing chamber 130 may be optionally defined as a cylindrical void having a chamber diameter $D_{MC}$ that is substantially equal to the set diameter $D_{FI}$ of fluid inlet 118. During operation, pressure at mixing chamber 130 may be less than that of pressure upstream from pressure plate 126.

In additional or alternative embodiments, dosing cap 146 defines low pressure port 124 upstream from mixing chamber 130, e.g., between a bottom portion of dosing head 144 and mixing chamber 130. Optionally, low pressure port 124 may extend through dosing cap 146 parallel to central axis CA. As a portion of the initial liquid flows into mixing chamber 130 from internal orifice 128 of pressure plate 126, treating liquid may be drawn into the dosing cap 146 from low pressure port 124. The treating liquid may be drawn in a direction opposite the primary flow path 114 before entering mixing chamber 130.

Returning to FIGS. 1 through 6, some embodiments of dosing cap 146 include base plate 132. Base plate 132 may be disposed beneath mixing chamber 130 along central axis CA, e.g., between solute chamber 112 and radial outlet 134. Base plate 132 may be integral to dosing cap 146, e.g., such that dosing cap 146 and base plate 132 form a substantially monolithic structure of a continuous material. As noted above, base plate 132 may effectively separate the primary flow path 114 from the solute chamber 112 during operations. Optionally, base plate 132 may be disposed across an internal portion of treatment enclosure 104, e.g., perpendicular to central axis CA. High pressure channel 136 and low pressure channel 138 defined through base plate 132 may be substantially parallel to central axis CA.

As illustrated, dosing cap 146 may include a mated collar 156 attached to retainer collar 152. In some such embodiments, mated collar 156 may be selectively disposed within annular groove 154 of retainer collar 152. One or more resilient seals, such as an o-ring, may be disposed between dosing head 144 and dosing cap 146, e.g., between mated collar 156 and retainer collar 152. Optionally, a port channel 158 may be defined between mated collar 156 and sidewall 148 as a portion of liquid treatment path 116. Port channel 158 may be in fluid communication between high pressure port 122 and high pressure capillary tube 140. Liquid intercepted by high pressure port 122 may flow into port channel 158 before passing to high pressure capillary tube 140.

In some embodiments, treatment enclosure 104 is provided as a discrete member selectively fixed to dosing head 144 and/or dosing cap 146, e.g., via a mated connector segment or friction fit. Treatment enclosure 104 may be a substantially cylindrical body coaxial with dosing head 144 and dosing cap 146 about central axis CA. As noted above, treatment enclosure 104 generally defines a solute chamber 112 housing a dosed media 113. In certain embodiments, solute chamber 112 is positioned below dosing cap 146 along central axis CA. In some embodiments, treatment enclosure 104 also defines a dosing chamber 160 housing at least a portion of passive dosing body 102. For instance, treatment enclosure 104 may be disposed about retainer collar 152 in direct engagement therewith. Dosing chamber 160 may receive a portion of dosing head 144 and dosing cap 146. Optionally, filter body 150 may be disposed within dosing chamber 160 and radially inward from treatment enclosure 104. For instance, filter body 150 may be between dosing cap 146 and treatment enclosure 104, e.g., at radial outlet 134. As illustrated, base plate 132 may separate solute chamber 112 from dosing chamber 160 along central axis CA. In optional embodiments, all or some of treatment enclosure 104 is received within dispensing head 106. For instance, dispensing head 106 may be embodied as a shower head, as illustrated in FIG. 1, that defines a central void to receive and hold treatment enclosure 106 along with passive dosing body 102. Dosing body 102 and treatment enclosure 106 provide a discrete assembly to be selectively inserted into and/or removed from the shower head.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A passive fluid dosing system comprising:
   a passive dosing body defining a primary flow path and a discrete liquid treatment path, the primary flow path being defined between a fluid inlet and a fluid outlet, the liquid treatment path being defined between a high pressure port and a low pressure port and bypassing a portion of the primary flow path, the high pressure port being positioned downstream from the fluid inlet, and the low pressure port being positioned downstream from the high pressure port and upstream from the fluid outlet;
   a pressure plate disposed within the passive dosing body between the high pressure port and the low pressure port, the pressure plate defining an internal orifice to decrease liquid pressure downstream from the pressure plate; and
   a treatment enclosure positioned in fluid communication between the high pressure port and the low pressure port along the liquid treatment path, the treatment enclosure defining a solute chamber housing a dosed media to generate a treating solution delivered to the primary flow path through the low pressure port,
   wherein the passive dosing body further defines a mixing chamber along the primary flow path downstream from the pressure plate and the low pressure port, wherein the passive dosing body comprises a dosing head and a dosing cap, wherein the dosing head comprises a sidewall defining the high pressure port, wherein the dosing cap is disposed over the sidewall of the dosing head, and wherein the dosing cap defines the mixing chamber and the low pressure port.

2. The passive fluid dosing system of claim 1, further comprising:
   a base plate separating the primary flow path from the solute chamber, wherein the base plate defines a high pressure channel and a low pressure channel along the liquid treatment path, wherein the high pressure channel is positioned in downstream fluid communication with the high pressure port, and wherein the low pressure channel is positioned in upstream fluid communication with the low pressure port.

3. The passive fluid dosing system of claim 2, further comprising:
   a low pressure capillary tube extending through the low pressure channel in fluid communication along the liquid treatment path between the solute chamber and the low pressure port.

4. The passive fluid dosing system of claim 2, further comprising:
   a high pressure capillary tube extending through the high pressure channel in fluid communication along the liquid treatment path between the high pressure port and the solute chamber.

5. The passive fluid dosing system of claim 1, wherein the dosed media includes a redox agent disposed within solute chamber.

6. The passive fluid dosing system of claim 5, wherein the redox agent is a chlorine-neutralizing agent or a chloramine-neutralizing agent.

7. The passive fluid dosing system of claim 1, further comprising:
   a secondary filtration media disposed along the primary flow path downstream from the low pressure port.

8. A passive fluid dosing system comprising:
   a dosing head including a sidewall defining a fluid inlet for the receipt of a flowing liquid, the dosing head including a pressure plate defining an internal orifice downstream from the fluid inlet, the dosing head further defining a high pressure port through the sidewall upstream from the internal orifice to intercept a portion of flowing liquid from the fluid inlet;
   a dosing cap disposed over the sidewall of the dosing head, the dosing cap defining a mixing chamber in downstream fluid communication with the internal orifice, the dosing cap defining a low pressure port in fluid communication between the high pressure port and the mixing chamber; and
   a treatment enclosure defining a solute chamber housing a dosed media therein, the treatment enclosure being positioned in downstream fluid communication with the high pressure port to receive the liquid intercepted through the high pressure port, the treatment enclosure being further positioned in upstream fluid communication with the low pressure port to deliver the treating solution.

9. The passive fluid dosing system of claim 8, wherein the dosing cap includes a base plate separating the mixing chamber from the solute chamber, wherein the base plate defines a high pressure channel and a low pressure channel along the liquid treatment path, wherein the high pressure channel is positioned in downstream fluid communication with the high pressure port, and wherein the low pressure channel is positioned in upstream fluid communication with the low pressure port.

10. The passive fluid dosing system of claim 8, further comprising:
a low pressure capillary tube extending through the dosing cap in fluid communication between the solute chamber and the low pressure port.

11. The passive fluid dosing system of claim 8, further comprising:
a high pressure capillary tube extending through the dosing cap in fluid communication between the high pressure port and the solute chamber.

12. The passive fluid dosing system of claim 8, wherein the dosed media includes a redox agent disposed within solute chamber.

13. The passive fluid dosing system of claim 12, wherein the redox agent is a chlorine-neutralizing agent or a chloramine-neutralizing agent.

14. The passive fluid dosing system of claim 8, further comprising:
a secondary filtration media disposed about the dosing cap downstream from the mixing chamber.

15. A passive fluid dosing system comprising:
a dispensing head defining a water nozzle;
a water supply conduit disposed in fluid communication with the dispensing head at a location upstream from the water nozzle;
a passive dosing body disposed between the water supply conduit and the dispensing head, the passive dosing body defining
a primary flow path extending from the water supply conduit to the dispensing head,
a liquid treatment path bypassing a portion of the primary flow path,
a high pressure port positioned along the liquid treatment path downstream from the water supply conduit,
a low pressure port positioned along the liquid treatment path downstream from the high pressure port and upstream from the dispensing head, and
a mixing chamber in fluid communication with the supply conduit downstream from the low pressure port;
a pressure plate disposed within the passive dosing body between the high pressure port and the low pressure port, the pressure plate defining an internal orifice to decrease liquid pressure downstream from the pressure plate; and
a treatment enclosure positioned in fluid communication between the high pressure port and the low pressure port along the liquid treatment path, the treatment enclosure defining a solute chamber housing a dosed media to generate a treating solution delivered to the primary flow path through the low pressure port,
wherein the passive dosing body comprises a dosing head and a dosing cap, wherein the dosing head comprises a sidewall defining the high pressure port, wherein the dosing cap is disposed over the sidewall of the dosing head, and wherein the dosing cap defines the mixing chamber and the low pressure port.

16. The passive fluid dosing system of claim 15, further comprising:
a base plate separating the primary flow path from the solute chamber, wherein the base plate defines a high pressure channel and a low pressure channel along the liquid treatment path, wherein the high pressure channel is positioned in downstream fluid communication with the high pressure port, and wherein the low pressure channel is positioned in upstream fluid communication with the low pressure port.

17. The passive fluid dosing system of claim 16, further comprising:
a low pressure capillary tube extending through the low pressure channel in fluid communication along the liquid treatment path between the solute chamber and the low pressure port; and
a high pressure capillary tube extending through the high pressure channel in fluid communication along the liquid treatment path between the high pressure port and the solute chamber.

18. The passive fluid dosing system of claim 15, wherein the dosed media includes a redox agent disposed within solute chamber.

19. The passive fluid dosing system of claim 15, further comprising a secondary filtration media disposed along the primary flow path downstream from the low pressure port.

* * * * *